United States Patent [19]
Wiley

[11] 3,861,977
[45] Jan. 21, 1975

[54] PROCESS FOR VACUUM BAG MOLDING

[75] Inventor: Nathaniel C. Wiley, Weston, Conn.

[73] Assignee: Rudkin-Wiley Corporation, Stratford, Conn.

[22] Filed: Nov. 21, 1972

[21] Appl. No.: 308,582

[52] U.S. Cl................. 156/242, 156/245, 156/285, 264/90, 264/101
[51] Int. Cl. .......................................... B29c 17/04
[58] Field of Search ............. 156/87, 77, 78, 79, 39, 156/40, 42, 242, 245, 285, 286, 287, 382; 264/88, 90, 101, 102

[56] References Cited
UNITED STATES PATENTS

| | | | |
|---|---|---|---|
| 2,989,112 | 6/1961 | Sonnleitner | 156/285 |
| 3,146,148 | 8/1964 | Mitchella et al. | 156/382 |
| 3,318,636 | 5/1967 | Callum | 156/212 |
| 3,378,422 | 5/1968 | Kemp | 156/285 |
| 3,575,756 | 4/1971 | Maus | 156/286 |
| 3,615,969 | 10/1971 | Hegy | 156/79 |
| 3,703,422 | 11/1972 | Yoshino | 156/285 |
| 3,706,621 | 12/1972 | Lichtman | 156/285 |

Primary Examiner—Charles E. Van Horn
Assistant Examiner—Caleb Weston
Attorney, Agent, or Firm—Mattern, Ware and Davis

[57] ABSTRACT

In the manufacture of a molded article having a shell layer and a core, an intimate bond is formed between the shell layer and the core layer of the molded article, using a unique variation of the vacuum bag technique of sealing the peripheral edge of the vacuum bag directly to a portion of the article. Using this technique, while providing for greater flexibility in the selection of sealing positions, only the critical portion of the article is exposed to the vacuum, thereby allowing the non-critical area to be exposed to air. As a result, greater flexibility in the selection of sealing positions is provided and, in most instances, eliminates the need for tailor-made vacuum bags.

8 Claims, 4 Drawing Figures

PATENTED JAN 21 1975  3,861,977

PROCESS FOR VACUUM BAG MOLDING

BACKGROUND OF THE INVENTION

This invention relates to bonding methods and more particularly to bonding methods employing a vacuum bag.

The fabrication of molded products incorporating a core material layer is well known in the art. Furthermore, the use of the vacuum bag technique for manufacture of molded products is also well known in the art. However, in prior art molding operations, the vacuum bag technique is always employed by completely enclosing the article being molded within the bag, such as by sealing the product and mold within the vacuum bag, or by sealing the peripheral edge of the vacuum bag directly to the mold, or by sealing the peripheral edge of the vacuum bag to the holding table or support structure for the mold. This can be extremely cumbersome and expensive in that larger vacuum bags must be employed and, depending upon the article being formed, difficult to obtain a good seal between the bag and the mold or the bag and the supporting structure for the mold. Furthermore, depending upon the size of the article being molded, the size of the bag may have to be quite large even though the area employing the core material layer may be relatively small.

Once the vacuum bag has been peripherally secured to the mold or supporting structure therefor, a vacuum is drawn on the bag thereby providing an intimate contact between one side of the vacuum bag and the outer surface of the article being molded. Upon evacuation of the air within the bag, the outer surface of the bag and, subsequently, the article being molded is exposed to ambient pressure, approximately 14.7 lbs. per square inch, or any other desired pressure between one and 14.7 lbs. per square inch, forcing an intimate contact between the two layers during curing.

It is an object of this invention to provide a molding method employing a vacuum bag which is a versatile and uniformly applicable to all molding operations.

Another object of this invention is to provide a vacuum bag molding operation of the above character which is less expensive and more easily employed than known methods.

Another object of this invention is to provide a vacuum bag molding operation of the above character which allows only the critical area to be enclosed within the vacuum bag with the remaining area exposed to the air.

A further object of this invention is to provide a vacuum bag molding operation which substantially reduces the time and effort required to obtain a convenient sealing point for the vacuum bag.

Another object of this invention is to provide a vacuum bag molding operation of the above character which substantially eliminates the need for expensive, tailor-made vacuum bags.

Other objects of this invention will in part be obvious, and will in part appear hereinafter.

SUMMARY OF THE INVENTION

In the vacuum bag molding operation of this invention, a first shell layer or a first laminate is applied to the mold and then a core layer is positioned directly in contact with the first layer. The vacuum bag is then placed over the core layer to be intimately bonded with the first layer, and the peripheral edge of the vacuum bag is sealed directly to the first layer.

This seal can be accomplished in many different ways, such as sealing to a portion of the core material by means of sealing gaskets and clamps, or sealing in a similar fashion directly against the first layer. In the preferred embodiment, a support member is positioned on the first layer, and the peripheral edge of the vacuum bag is sealed against this support member.

The method of this invention is extremely advantageous in the manufacture of fiberglass and resin molded articles, and especially in the manufacture of such articles having a central core layer sandwiched between two layers of fiberglass and resin where the core area is less than the area of the fiberglass and resin layer. In this situation, a primary bond can be obtained between the two fiberglass and resin layers without the expensive and time consuming step of sanding the first fiberglass and resin layer before bonding to the second fiberglass and resin layer.

Using the method of this invention, only the critical area where the core layer must be bonded to the first fiberglass and resin layer need be covered by the vacuum bag. As a result, the remaining area of the first fiberglass and resin layer remains exposed to the air. Using an air-inhibiting resin, this area of the first layer will remain tacky an will not cure. Consequently, once the core layer is securely bonded to the first fiberglass and resin layer, the second fiberglass and resin layer can be applied with a primary bond being obtained between the two fiberglass and resin layers, as well as between the second fiberglass and resin layer and the core layer.

If desired, a surface gel coat can be applied to the mold before the first glass-resin layer is applied and if desired to the second fiberglass-resin layer. This provides the final product with a hard, smooth, substantially impermeable surface layer.

The invention accordingly comprises the several steps and the relation of one or more of such steps with respect to each of the others thereof, which will be exemplified in the process hereinafter disclosed and the scope of the invention will be indicated in the Claims.

THE DRAWINGS

For a fuller understanding of the nature and objects of the invention, reference should be had to the following detailed description taken in connection with the accompanying drawings, in which.

DETAILED DESCRIPTION

Figure 1:
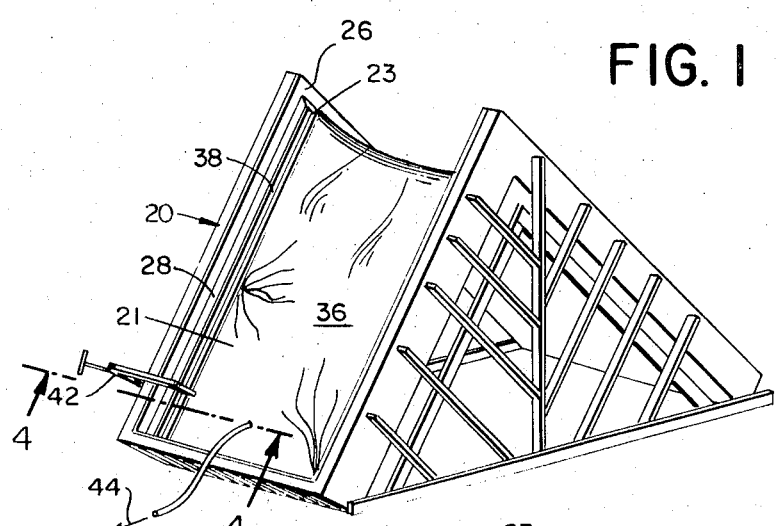
FIG. 1 is a perspective view of an article in a mold employing the vacuum bag process of this invention.
Figure 2:
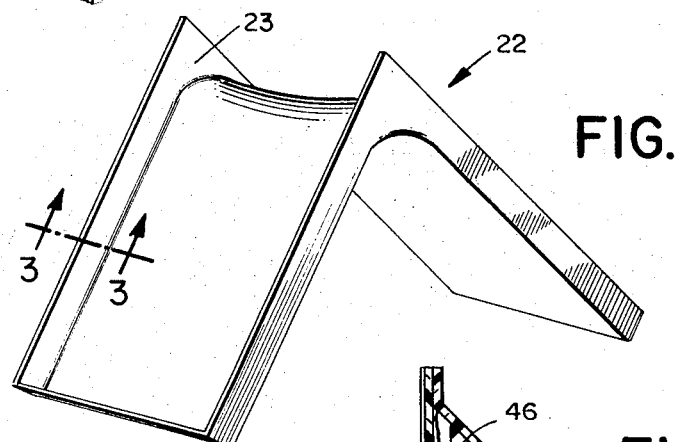
FIG. 2 is a perspective view of the molded article when completed.

In FIG. 1, vacuum bag 36 is shown mounted in place on mold 20 in accordance with the process of this invention. For exemplary purposes only, the molding process of this invention is described in relationship to the manufacture of a modular building unit. A completely molded modular building unit 22 is shown in FIG. 2. As can be seen therein, modular building unit 22 incorporates an outwardly depending flange 23 peripherally surrounding the entire modular building unit. As a result, mold 20 incorporates a similar flange construction.

Although the molding process of this invention is applicable to both male and female molds, female mold 20 is employed for exemplary purposes only. As is obvious to one skilled in the art, the use of a female mold simplifies the physical construction of an article as large as building unit 22. Furthermore, the removal of unit 22 from mold 20 is simplified with mold 20 being female, since after curing, unit 22 will tend to shrink, thereby providing for easy separation of unit 22 from mold 20.

Figure 3:
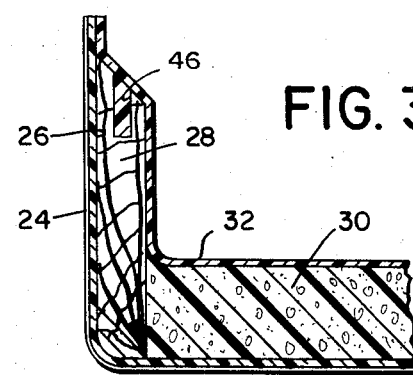
FIG. 3 is a cross-sectional elevation view partially broken away of the molded article taken along line 3—3 of FIG. 2.

In FIG. 3, a typical cross-section of unit 22 is shown. Starting with the side which is in contact with the surface of mold 20, unit 22 comprises a surface layer 24 of gel coat, an inner layer 26 of fiberglass reinforced plastic, a core material layer consisting of polyurethane foam layer 30 in the central portion of unit 22 and a wood beam layer 28 positioned for reinforcement of the flanges of unit 22, and finally an outer layer 32 of fiberglass reinforced plastic. If desired, a second surface gel coat can be applied to outer layer 32.

Figure 4:
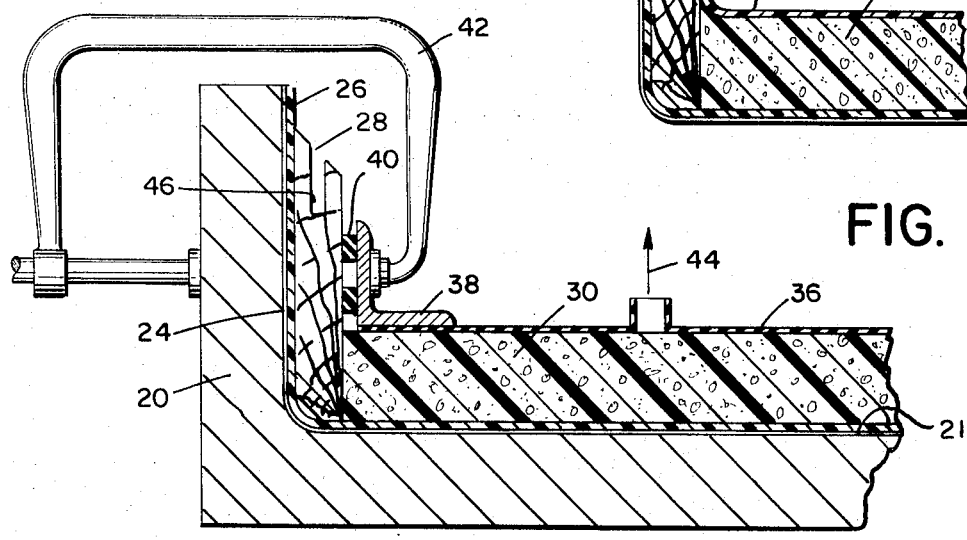
FIG. 4 is a cross-sectional elevation view partially broken away of an article in a mold employing the vacuum bag process of this invention taken along line 4—4 of FIG. 1.

By referring to FIG. 4, the manufacturing process of this invention can best be understood. In order to manufacture a product, typified by unit 22, using the process of this invention, the initial step is to place the fiberglass resin layer on the mold. In the manufacture of modular building unit 22, a hard, smooth surface coating is desired. Therefore, the initial step in the manufacture of this product with an outer surface coating is to spray layer 24 of gel coat over the entire mold surface 21 of mold 20. The gel coat layer 24 is a layer of resin which is applied to the mold surface to provide the product with a hard, substantially impervious surface layer.

The second step in manufacturing unit 22 is to spray a layer 26 of chopped fiberglass and resin onto the gel coat layer 24. As is well known in the art, various other fibers such as jute fiber, polypropylene fiber, dacron fiber and other such fiber materials, and resin systems can be employed to form layer 26. For purposes which are convenient to the manufacture of this product, the particular combination of chopped fiberglass strands in a resin carrier is employed.

The next step is to apply the core layer which is to be bonded to layer 26. In manufacturing modular building unit 22, a polyurethane foam layer 30 is applied to the central portion of the unit, while a wood beam layer 28 is applied to the flange area for reinforcement of this area. Wood beam layer 28 and polyurethane foam layer 30 are placed in the desired location directly on the fiberglass reinforced plastic layer 26.

In order to properly form a strong unit 22, it is important that wood beam layer 28 and foam layer 30 are intimately bonded to the fiberglass resin layer 26. This bonding situation is normally found in the art of molding and, one of the well known processes for providing a secure bond between these dissimilar layers is to employ a rubber vacuum bag. However, the only known technique employing a vacuum bag is to completely cover the entire product being molded within the confines of the vacuum bag. This is accomplished in several ways, by either placing the product and the mold completely within a vacuum bag, securing the peripheral edge of the vacuum bag directly to the mold, or securing the peripheral edge of the vacuum bag to a supporting structure for the mold and the product.

In the molding process of this invention, the peripheral edge of the vacuum bag is sealed directly to the product being molded. As a result, several important advantages are produced. One such advantage is that only the critical area need be covered by the vacuum bag, thereby leaving the remaining area exposed to the air. Furthermore, a specially designed, tailor-made vacuum bag which will completely contact all of the surface of the article being molded does not have to be manufactured.

By employing the process of this invention with reference to the exemplary product discussed above, the fiberglass resin layer 26 and gel coat 24 are exposed to the atmosphere, while the remainder of the article being molded is sealed under the vacuum bag. This allows the exposed edge to be trimmed from the mold before these layers have cured. Consequently, trimming is easily accomplished with a knife instead of the expensive laborious process of sawing.

A final advantage of the process of this invention is the elimination of tedious and expensive bag clean-up after the vacuum bag has been employed. With prior art processes, the vacuum bag is in contact with the fiberglass resin layers and, as a result, the resin adheres to the bag and this resin has to be scrapped off of the vacuum bag. With the process of this invention, the vacuum bag never comes in contact with this fiberglass resin layer and, as a result, the clean-up step is eliminated.

As shown in FIGS. 1 and 4, the peripheral edge of vacuum bag 36 is secured to angle irons 38. Angle irons 38 are then sealed directly against wood layer 28. An air tight seal around the peripheral edge of the rubber vacuum bag 36 is assured by providing an air tight seal between angle iron 38 and vacuum bag 36, positioning gasket material 40 between angle iron 38 and wood layer 28, and then clamping angle iron 38 against wood layer 28 by means of a C-clamp 42. Although only a single C-clamp 42 is shown, a plurality of C-clamps are employed to properly seal the vacuum bag. The bond desired is then achieved by connecting vacuum outlet 44 of vacuum bag 36 to a vacuum pump and withdrawing all of the air within the sealed bag. This allows ambient pressure of approximately 14.7 lbs. per square inch to be applied to the surface of the bag, thereby forcing foam layer 30 directly against the fiberglass resin layer 26. This condition is maintained until the fiberglass layer has been cured.

As can best be seen in FIGS. 3 and 4, wood layer 28 incorporates a resin directing channel 46. After vacuum bag 36 has been clamped in place, as shown in FIGS. 1 and 4, resin from fiberglass resin layer 26 begins to flow over wood layer 28. By incorporating channel 46 in wood layer 28, this resin overflow is directed through channel 28 down the entire length of wood layer 28 to the base of mold 20. As a result, resin is prevented from flowing onto gasket material 40, thereby allowing gasket material 40 to be easily reused without an expensive clean-up operation, or without becoming impossible to be reused.

In the preferred embodiment of this invention, an air inhibiting resin is employed in layer 26. As is well known in the art, air inhibiting resin will only completely cure in the absence of air. By employing air inhibiting resin in layer 26, the portion of layer 26 which is not sealed within vacuum bag 36 will not cure. Consequently, two distinct advantages are achieved. First, this exposed area can be trimmed during the vacuum bag operation to a desired length. Secondly, a second fiberglass resin layer can be applied over this surface and can achieve a primary bond at this exposed area. If air inhibiting resin were not employed, the exposed area would cure and only a secondary bond would be achieved between this exposed area and the second fiberglass resin layer, or else, the cured surface would have to be sanded prior to application of the second fiberglass and resin layer.

During the manufacture of a molded article which incorporates use of a gel coat layer, it has been discovered that the timing sequence for application of the remaining layers and the installation of the vacuum bag is extremely important. After the gel coat layer has been applied to the mold surface, this layer begins to shrink as it air dries. Consequently, if an inordinate amount of time is allowed to lapse between the application of the gel coat layer and before the remaining layers are applied thereto and the vacuum bag sealed in place, the molded article produced will incorporate unwanted wrinkles in the gel coat layer. Although the length of time between the application of the gel coat layer and the application of the remaining layers and the vacuum bag may vary depending upon the thickness of the gel coat layer applied and its composition, it has generally been found that the remaining layers and the vacuum bag should be secured in place about the gel coat layer within twelve hours of the application of the gel coat layer to the mold. Within this time limit, the gel coat layer will not have a chance to shrink to an undesirable amount and wrinkles will not be present in the finished product.

Although the method of this invention has been disclosed with the reference to the manufacture of a molded article from fiberglass and resin, the teaching of this invention is applicable to the manufacture of any molded article incorporating at least one shell layer and a core layer. The method of this invention is particularly useful in the manufacture of any molded article in which the core layer to be bonded to the shell layer comprises an area less than the shell layer. Using the teaching of this invention, only the critical area to be bonded is covered with the vacuum bag, thereby providing the benefits clearly disclosed above. Although the peripheral edge of the vacuum bag, using the method of this invention, can be sealed directly to the shell layer; in the preferred embodiment, a support member is positioned in the area along which the vacuum bag is to be sealed, and the vacuum bag is sealed directly to the support member. If desired, the support member can be simultaneously bonded to the shell layer; or, if such bonding is not desired, bonding agents would not be included in this area or parting agents would be included in order to prevent bonding of the support member to the shell area.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following Claims are intended to cover all of the generic an specific features of the invention herein described, and all statements of the scope of the invention, which, as a matter of language, might be said to fall therebetween.

Having described my invention, what I claim as new and desire to secure by Letters Patent is:

1. A method for bonding a core layer between two shell layers comprising the steps of:
   A. applying a first shell layer to a supporting surface wherein said first shell layer comprises an air inhibiting compound;
   B. applying a core layer directly to said first shell layer for bonding therewith;
   C. covering said core layer with a vacuum bag;
   D. sealing the peripheral edges of said bag directly to a portion of said shell layer extending peripherally beyond said core layer;
   E. withdrawing air from within the sealed bag, thereby reducing the air pressure therein;
   F. maintaining said reduced air pressure within said sealed bag until the bond is cured between said shell layer and said core layer; and
   G. bonding a second shell layer to said core layer and said shell layer.

2. The method defined in claim 1, comprising the additional steps of:
   F. positioning a support member peripherally about said core layer after applying said core layer to said first shell layer; and
   G. sealing the peripheral edge of said vacuum bag directly to said support member.

3. A method for bonding a core layer between two fiber and resin layers comprising the steps of:
   A. applying a first fiber and resin layer to a mold wherein said first fiber and resin layer comprises an air-inhibiting resin;
   B. applying a core layer directly to said first fiber and resin layer for bonding therewith;
   C. covering said core layer to be bonded with a vacuum bag;
   D. sealing the peripheral edges of said vacuum bag directly to a portion of the fiber and resin layer on the mold extending peripherally beyond said core layer;
   E. withdrawing air from within the sealed bag, thereby reducing the air pressure therein;
   F. maintaining said reduced air pressure within said sealed bag until said first fiber and resin layer and said core layer are intimately bonded;
   G. removing said vacuum bag from the cured intimately bonded layers; and
   H. applying a second fiber and resin layer to said core layer and said first fiber and resin layer.

4. The method defined in claim 3, comprising the additional step of:
   I. applying a surface gel coat layer to the mold prior to application of said first fiber and resin layer.

5. The process defined in claim 4, wherein Steps (A)–(F) are carried out within 12 hours after the performance of Step (G).

6. The process defined in claim 3, comprising the additional step of:
   I. applying a support member directly to said first fiber and resin layer for bonding therewith.

7. The process defined in claim 6, wherein the peripheral edge of said vacuum bag is sealed against said support member.

8. The method defined in claim 6, wherein said support member incorporates a resin overflow directing channel.

* * * * *